Figure 4:
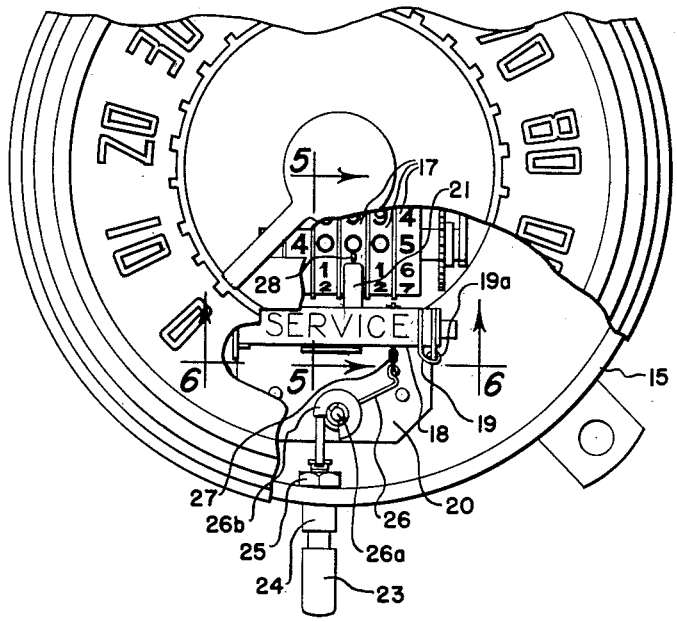

March 18, 1952  M. M. MERRITT ET AL  2,589,623
MILEAGE SERVICE INDICATOR FOR MOTOR VEHICLES
Filed June 13, 1949  2 SHEETS—SHEET 1
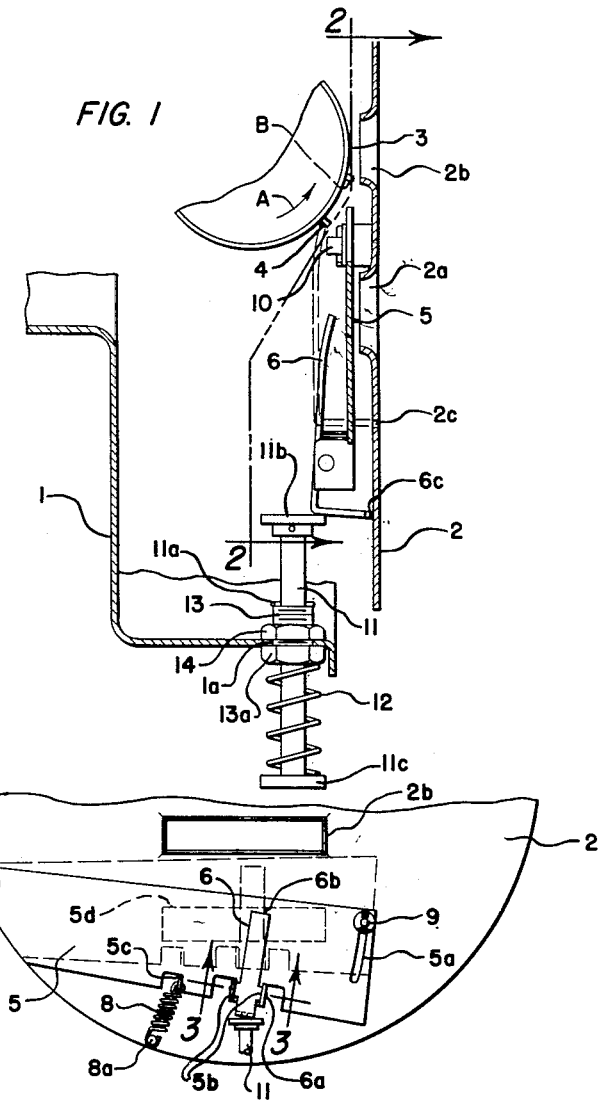
INVENTORS
MORTIMER M. MERRITT &
JOHN W. DADISMAN
BY
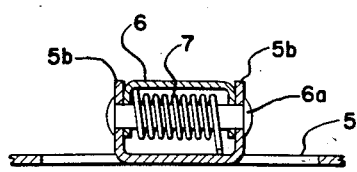
AGENT March 18, 1952   M. M. MERRITT ET AL   2,589,623
MILEAGE SERVICE INDICATOR FOR MOTOR VEHICLES
Filed June 13, 1949   2 SHEETS—SHEET 2

INVENTORS
MORTIMER M. MERRITT &
JOHN W. DADISMAN
BY
Wm. H. Dean
AGENT

Patented Mar. 18, 1952

2,589,623

UNITED STATES PATENT OFFICE 2,589,623

MILEAGE SERVICE INDICATOR FOR MOTOR VEHICLES

Mortimer M. Merritt, Santa Barbara, and John W. Dadisman, San Diego, Calif.; said Dadisman assignor to said Merritt Application June 13, 1949, Serial No. 98,646

5 Claims. (Cl. 116—129)

Our invention relates to a mileage service indicator for motor vehicles, and the objects of our invention are:

First, to provide a mileage service indicator for vehicles of this class which will indicate to the operator of a vehicle the fact that the motor vehicle which he is operating has traveled substantially one thousand miles, or any certain distance, since lubrication and other service performed on said vehicle;

Second, to provide a mileage service indicator for motor vehicles of this class which may be readily operated in connection with the speedometer mileage indicating drums of a conventional vehicle speedometer without undue change in the conventional speedometer mechanism;

Third, to provide a mileage service indicator for motor vehicles having novel resetting means, which permits the operator or serviceman to reset the indicator after it has been automatically operated by the speedometer mileage indicating drums;

Fourth, to provide a mileage service indicator for motor vehicles of this class which operates as a safety feature in connection with a motor vehicle, so that the operator is automatically reminded of the necessity for lubrication and other service when the motor vehicle has traversed a certain number of miles;

Fifth, to provide a mileage service indicator for motor vehicles in which a simple spring-loaded pivoted plate is maintained in certain position by a latch engaged by a projecting pin on one of the speedometer mileage indicating drums, which rotates one full revolution each one thousand miles, causing the latch to be tripped and to release the plate, which passes a warning signal into adjacent relationship with a service indicator opening in the dial face plate of the speedometer, all of which provides for the installation of my mileage service indicator for motor vehicles in connection with various conventional speedometers; and Sixth, to provide a mileage service indicator for motor vehicles of this class which is very simple and economical of construction, efficient in operation, and which will not readily deteriorate or get out of order.

Figure 5:
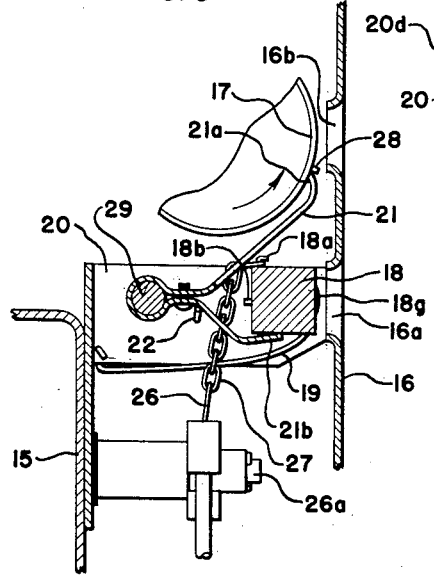
Figure 6:
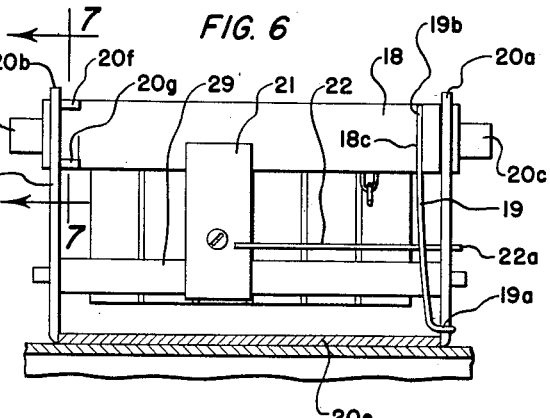
Figure 7:
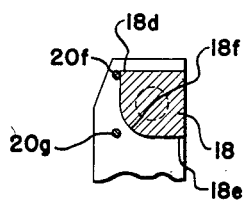

With these and other objects in view, as will appear hereinafter, our invention consists of certain novel features of construction, combination and arrangement of parts and portions, as will be hereinafter described in detail and particularly set forth in the appended claims, reference being had to the accompanying drawings and to the characters of reference thereon, forming a part of this application, in which:

Fig. 1 is a vertical sectional view showing a fragmentary portion of a conventional speedometer and showing our mileage service indicator for motor vehicles in connection therewith; Fig. 2 is a fragmentary sectional view, taken from the line 2—2 of Fig. 1; Fig. 3 is an enlarged fragmentary sectional view, taken from the line 3—3 of Fig. 2; Fig. 4 is a fragmentary front elevational view of a conventional automobile speedometer, showing portions thereof broken away, and illustrating a modified form of my mileage service indicator for motor vehicles in connection therewith; Fig. 5 is an enlarged fragmentary sectional view, taken from the line 5—5 of Fig. 4; Fig. 6 is an enlarged fragmentary sectional view, taken from the line 6—6 of Fig. 4; and Fig. 7 is a fragmentary sectional view, taken from the line 7—7 of Fig. 6.

Similar characters of reference refer to similar parts and portions throughout the several views of the drawings.

The speedometer casing 1, speedometer dial face plate 2, speedometer mileage indicating drums 3, pin 4, arm 5, trip lever 6, springs 7 and 8, stop pin 9, bearing pin 10, reset plunger 11, reset spring 12, bushing 13 and the nut 14 constitute the principal parts and portions of our mileage service indicator for motor vehicles.

The speedometer casing 1 and speedometer mileage indicating drums 3 are conventional speedometer construction, and the speedometer dial face plate 2 is substantially conventional, except that it is provided with an additional opening 2a therein, adjacent to the conventional opening 2b through which numerical designations of distance are viewed on the arcuate faces on the mileage indicating drums 3. Pivoted by means of the bearing pin 10 projecting from the rear side of the speedometer dial face plate 2 is the arm 5. This arm 5 is a flat sheet metal arm, having a slot 5a near its opposite end, arcuate about the center of the bearing pin 10. Through this slot 5a projects the stop pin 9, which is fixed to the rear surface of the speedometer dial face plate 2. Integral with the arm 5 are formed tabs 5b, which extend at right angles to the plane of the flat arm 5, in spaced relationship to each other. Pivotally mounted intermediate these tabs 5b is the trip lever 6, which forms a latch for the arm 5 when in certain position, as will be hereinafter described in detail.

This lever 6 is pivotally mounted on a pin, 6a, extending through the tabs 5b, as shown in Fig. 3 of the drawings, and positioned around the pin 6a is a coil spring 7, which tends to operate torsionally for forcing the end portion 6b of the trip lever 6 into the dash line position, as shown in Fig. 1 of the drawings, for engaging the small index stub 6c in the opening 2c of the speedometer dial face plate 2. The spring 8 is secured to a formed tab 5c of the arm 5, and at its opposite end is secured to a pin 8a, fixed to the speedometer dial face plate 2, which tends to pivot the arm 5 about the axis of the pin 10, into the solid line position shown in Fig. 2 of the drawings. The normally front side of the arm 5, adjacent the opening 2a in the speedometer dial face plate 2, is provided with a service indicating pattern 5d, adapted to coincide with the opening 2a, and this pattern 5d may be colored red or include the word "Service," or some other designation arranged to indicate the necessity for servicing the vehicle with which our mileage service indicator for vehicles is connected, so that the operator will automatically be warned that the vehicle has traveled a certain distance since the last servicing.

When the trip lever 6 is in the dash line position, as shown in Figs. 1 and 2 of the drawings, the stub portion 6c is positioned in the opening 2c of the speedometer dial face plate 2, and the normally upper end 6b of the trip lever 6 is in alignment with the pin 4, which travels in the direction as indicated by the arrow A, in connection with one of the speedometer mileage indicating drums, preferably the one revolving one complete revolution each one thousand miles of travel by the vehicle in connection with which our mileage service indicator is operated.

The reset plunger 11 is reciprocally mounted in the hollow cylindrical externally screw-threaded bushing 13, which extends through an opening 1a in the speedometer casing 1, as shown in Fig. 1 of the drawings, and extending through the shank of the reset plunger 11 is a pin 11a, which limits the downward travel of the reset plunger 11 in the bushing 13. The normally upper end of the reset plunger 11 is provided with a contacting head 11b, engageable with the normally lower end of the trip lever 6, as shown in Fig. 1 of the drawings. The nut 14 is externally screw-threaded on the bushing 13, in opposed relationship to the head 13a of the bushing 13, which is on the opposite side of the side wall of the speedometer casing 1 from the nut 14, all as shown best in Fig. 1 of the drawings.

The spring 12 is a compression spring intermediate the hand-engaging button portion 11c of the reset plunger 11 and the head portion 13a of the bushing 13, all as shown best in Fig. 1 of the drawings. This spring 12 tends to force the reset plunger 11 downwardly, causing the pin 11a to engage the upper end of the bushing 13, all as shown best in Fig. 1 of the drawings.

The operation of our mileage service indicator for motor vehicles is substantially as follows:

Let us assume that the arm 5 and trip lever 6 are in the dash line position, as shown in Figs. 1 and 2 of the drawings, and that the pin 4 is in the dash line position B, as shown in Fig. 1 of the drawings. Continued operation of the vehicle in connection with which our mileage service indicator is operated causes rotation to the extent of one complete revolution of the speedometer mileage indicator drum 3 once each thousand miles, which engages the end of the pin 4 which the normally upper end 6b of the trip lever 6, pivoting the same toward the speedometer dial face plate 2, and disengaging the stub 6c from the opening 2c in the speedometer dial face plate 2, permitting the spring 8 to force the arm 5 into the position as shown in Fig. 2 of the drawings, wherein the pattern 5d is visible through the opening 2a in the speedometer dial face plate 2, indicating to the operator of the vehicle that the particular vehicle has been driven a certain distance since being serviced. After the vehicle has been properly serviced, the portion 11c of the reset plunger 11 may be forced upwardly, causing the plate 11b to engage the trip lever 6 and carry the arm 5 into the dash line position as shown in Fig. 2 of the drawings, wherein the stub 6c falls into the opening 2c of the speedometer dial face plate 2, latching the same in secure stationary position until the pin 4 again rotates about the axis of the particular mileage indicating drum 3, whereupon the trip lever 6 is again disengaged from the opening 2c at its stub 6c. The spring 12 retracts the reset plunger 11 to position as shown in Fig. 1 of the drawings, out of interfering relationship with the trip lever 6 and the arm 5, so that it may be readily moved downwardly by the spring 8 for presenting the pattern 5d at the opening 2a in the speedometer dial face plate 2. It will be here noted that the pivotal movement of the arm 5 is substantially limited by the arcuate slot 5a at its extremities upon the pin 9, which is stationarily fixed to the rear surface of the speedometer dial face plate 2, as shown best in Fig. 2 of the drawings.

In the modification, as shown in Figs. 4 to 7 inclusive of the drawings, the speedometer casing 15, speedometer dial face plate 16, speedometer mileage indicating drums 17, tumbler 18, tumbler spring 19, tumbler frame 20, trip lever 21, trip lever spring 22, resetting plunger 23, bushing 24, nut 25, lever 26, chain 27, pin 28 and lever axle 29 constitute the principal parts and portions of said modification.

The speedometer casing 15, speedometer dial face plate 16 and the mileage indicating drums 17 are substantially conventional speedometer structure. Fixed to the inner side of the speedometer casing 15 is the tumbler frame 20, which is a substantially U-shaped frame, having extending arm portions 20a and 20b, as shown in Fig. 6 of the drawings. Intermediate these arms 20a and 20b is the tumbler 18, which is a substantially square in cross-section member, pivotally mounted on bearing pins 20c and 20d, fixed to the arms 20a and 20b of the tumbler frame 20.

This tumbler 18 is positioned adjacent an opening 16a in the speedometer dial face plate 16, directly below the conventional opening 16b, through which numerical designations are viewed on the surface of the drums 17. The tumbler 18 is provided with a hook 18a near one cross-sectional corner thereof, to which the chain 27 is attached at its one end. The opposite end of the chain 27 is fixed to the lever 26, which is pivotally mounted on a pin 26a, secured to the base of the tumbler frame 20, all as shown best in Fig. 4 of the drawings.

This lever 26 is provided with a quadrant portion 26b engageable with the resetting plunger 23 at its upper end, which is reciprocally mounted in the bushing 24 fixed to the lower portion of the speedometer casing 15 by means of the nut 25. The trip lever 21 is pivotally mounted on the lever axle 29, which is interposed between the arms 20a and 20b of the tumbler frame 20 near its base portion 20e, as shown best in Fig. 7 of the drawings. This trip lever 21, as shown in Fig. 5 of the drawings, is provided with a pin-engaging portion 21a which is maintained in close proximity to the periphery of the mileage indicating drum 17, and which is engageable by the pin 28 fixed to one of the mileage indicating drums 17, preferably the drum 17 as shown in Fig. 4 of the drawings, which bears the third digit which may be viewed through the opening 16b in the speedometer dial face plate 16. The spring 22, at its end 22a, engages the leg 20a of the tumbler frame 20, and tends to hold the end portion 21a of said trip lever 21 in close proximity to the arcuate surface of the mileage indicating drum 17, so that it may be contacted by the pin 28 during each revolution of the mileage indicating drum 17.

The opposite end of the trip lever 21 is provided with a tumbler-engaging arm portion 21b, which is adapted to engage a stop pin 18b on the tumbler 18 when rotated in a counter-clockwise direction substantially ninety degrees to that as shown in Fig. 5 of the drawings. It will be here noted that the tumbler spring 19 is a torsion spring, fixed at its one end, 19a, to the arm 20a of the tumbler frame 20, and which is wound around the tumbler 18 at its opposite end 19b, which is positioned within an annular groove 18c of the tumbler 18, all as shown best in Fig. 6 of the drawings.

It will be here noted that the arm portion 20b of the tumbler frame 20 is provided with a pair of stop pins 20f and 20g, which are engageable with the corners 18d and 18e, respectively, of the tumbler 18 to limit the travel thereof to substantially ninety degrees of rotational movement, all as shown best in Figs. 6 and 7 of the drawings. The tumbler 18, at its one end adjacent the stop pins 20f and 20g, is provided with an arcuate relieved portion 18f adapted to clear the pins 20f and 20g at one corner of the tumbler 18.

The operation of the modified structure shown in Figs. 4 to 7 inclusive of the drawings is substantially as follows:

When the tumbler 18 and connected cooperative mechanism is in the position as shown in Fig. 5 of the drawings, the face 18g of the tumbler 18 indicates through the opening 16a of the speedometer dial face plate 16 the need for servicing the vehicle to which the mileage service indicator is connected, and after the service has been rendered and the vehicle has been properly lubricated or otherwise serviced, the plunger 23 is forced upwardly and the upper end thereof engages the quadrant 26b of the lever 26, which forces the outer end of the lever 26 in connection with the chain 27 downwardly, which transfers force to the hook 18a of the tumbler 18, causing substantially ninety degrees of rotational movement of the tumbler 18 in a counter-clockwise direction until the pin 18b has engaged the end 21b of the trip lever 21, which prevents the torsion spring 19 from rotating the tumbler 18 in a clockwise direction until the trip lever 21 is engaged by the pin 28 on one of the mileage indicating drums 17. It will be noted that after service, complete rotation of the mileage indicating drum 17 on which the pin 28 is positioned occurs during the travel of a predetermined distance, so that the trip lever 21 is actuated or engaged at its end 21a by the pin 28, subsequent to the travel of a predetermined distance after the service of the vehicle, which forces the end 21b of the trip lever 21 downwardly in an arcuate path about the axis of the axle 29, which relieves the end 21b from the pin 18b, permitting the torsion spring 19 to rotate the tumbler 18 in a clockwise direction until the corner 18d engages the stop pin 20f, presenting the service indication surface of the tumbler 18 adjacent the opening 16a in the speedometer dial face plate 16, so that the operator of the vehicle is again warned that the vehicle needs further service.

Though we have shown and described a particular construction, combination and arrangement of parts and portions, and a certain modification, we do not wish to be limited to this particular construction, combination and arrangement, nor to the modification, but desire to include in the scope of our invention the construction, combination and arrangement substantially as set forth in the appended claims.

Having thus described our invention, what we claim as new and desire to secure by Letters Patent is:

1. In a mileage service indicator for motor vehicles, a plate having an opening therein, a conventional speedometer having rotatable mileage indicating drums, a projecting pin secured to and extending from the arcuate surface of one of said mileage indicating drums, a trip lever engageable by said projecting pin, a service indicator member movable adjacent said opening and having means on which said trip lever is pivotally mounted, resilient means tending to move said service indicator member, whereby engagement of said pin with said trip lever releases said service indicator member and permits said resilient means to force said indicator member and said trip lever to move relative to said window for indicating the necessity of servicing the vehicle with each rotation of said mileage indicating drum to which said pin is secured.

2. In a mileage service indicator for motor vehicles, a plate having an opening therein, a conventional speedometer having rotatable mileage indicating drums, a projecting pin secured to and extending from the arcuate surface of one of said mileage indicating drums, a trip lever engageable by said projecting pin, a service indicator member movable adjacent said opening and having means on which said trip lever is pivotally mounted, resilient means tending to move said service indicator member, whereby engagement of said pin with said trip lever releases said service indicator member and permits said resilient means to force said indicator member and said trip lever to move relative to said window for indicating the necessity of servicing the vehicle with each rotation of said mileage indicating drum to which said pin is secured, resetting means for said service indicator member for forcing the same into engagement with said pin and moving the same relative to said window in said speedometer dial face plate after the vehicle has been serviced.

3. In a mileage service indicator for motor vehicles, a plate having an opening therein, a conventional speedometer having rotatable mileage indicating drums, a projecting pin secured to and extending from the arcuate surface of one of said mileage indicating drums, a trip lever engageable by said projecting pin, a service indicator member movable adjacent said opening and having means on which said trip lever is pivotally mounted, resilient means tending to move said service indicator member, and whereby engagement of said pin with said trip lever releases said service indicator member and permits said resilient means to force said indicator member and said trip member to move relative to said window for indicating the necessity of servicing the vehicle with each rotation of said mileage indicating drum to which said pin is secured, resetting means for said service indicator member for forcing the same into engagement with said pin and moving the same relative to said window in said speedometer dial face plate after the vehicle has been serviced, stop means in connection with said service indicator member for limiting the movement thereof relative to said opening in said speedometer dial face plate.

4. In a mileage service indicator for motor vehicles, a plate having an opening therein, a conventional speedometer having rotatable mileage indicating drums, a projecting pin secured to and extending from the arcuate surface of one of said mileage indicating drums, a trip lever engageable by said projecting pin, a service indicator member movable adjacent said opening and having means on which said trip lever is pivotally mounted, resilient means tending to move said service indicator member, and whereby engagement of said pin with said trip lever releases said service indicator member and permits said resilient means to force said indicator member and said trip lever to move relative to said window for indicating the necessity of servicing the vehicle with each rotation of said mileage indicating drum to which said pin is secured, resetting means for said service indicator member for forcing the same into engagement with said pin and moving the same relative to said window in said speedometer dial face plate after the vehicle has been serviced, stop means in connection with said service indicator member for limiting the movement thereof relative to said opening in said speedometer dial face plate, said resetting means including a plunger which may be manually operated.

5. In a mileage service indicator for motor vehicles, a plate having an opening therein, a conventional speedometer having rotatable mileage indicating drums, a projecting pin secured to and extending from the arcuate surface of one of said mileage indicating drums, a trip lever engageable by said projecting pin, a service indicator member movable adjacent said opening and having means on which said trip lever is pivotally mounted, resilient means tending to move said service indicator member, and whereby engagement of said pin with said trip lever releases said service indicator member and permits said resilient means to force said indicator member and said trip lever to move relative to said window for indicating the necessity of servicing the vehicle with each rotation of said mileage indicating drum to which said pin is secured, said service indicator member being pivotally slidable parallel to the rear surface of said speedometer dial face plate.

MORTIMER M. MERRITT.
JOHN W. DADISMAN.

REFERENCES CITED

The following references are of record in the file of this patent:

UNITED STATES PATENTS

| Number | Name | Date |
|---|---|---|
| 1,774,015 | Johnson | Aug. 26, 1930 |
| 1,778,593 | Hain | Oct. 14, 1930 |
| 1,948,427 | Moecker | Feb. 20, 1934 |
| 2,130,613 | Colee | Sept. 20, 1938 |
| 2,253,827 | Vinton | Aug. 26, 1941 |